United States Patent [19]
Bushman

[11] Patent Number: 5,542,247
[45] Date of Patent: Aug. 6, 1996

[54] APPARATUS POWERED USING LASER SUPPLIED ENERGY

[75] Inventor: Boyd B. Bushman, Lewisville, Tex.

[73] Assignee: Lockheed Corporation, Fort Worth, Tex.

[21] Appl. No.: 265,385

[22] Filed: Jun. 24, 1994

[51] Int. Cl.$^6$ ........................................................ F02K 7/00
[52] U.S. Cl. .......................................................... 60/203.1
[58] Field of Search ........................ 60/203.1; 123/143 B

[56]                References Cited

U.S. PATENT DOCUMENTS

| | | | |
|---|---|---|---|
| 3,473,879 | 10/1969 | Berberich | 123/143 B |
| 3,495,406 | 2/1970 | Donatelli et al. | 60/227 |
| 3,634,778 | 1/1972 | Melikian et al. | 372/34 |
| 3,812,783 | 5/1974 | Yang et al. | 102/201 |
| 4,416,226 | 11/1983 | Nishida et al. | 123/143 B |
| 4,702,808 | 10/1987 | Lemelson | 204/157.41 |
| 4,741,154 | 5/1988 | Eidelman | 60/39.34 |
| 4,870,903 | 10/1989 | Carel et al. | 102/201 |
| 5,152,135 | 10/1992 | Kare | 60/203.1 |
| 5,224,663 | 7/1993 | Criswell | 244/1 R |
| 5,367,869 | 11/1994 | DeFreitas | 60/39.06 |

OTHER PUBLICATIONS

T. Bussing and G. Pappas, "An Introduction to Pulse Detonation Engines," 32nd Aerospace Sciences Meeting & Exhibit, Jan. 10–13, 1994 (14 pages).

*Primary Examiner*—Stephen C. Bentley
*Attorney, Agent, or Firm*—James E. Bradley; Mark W. Handley

[57]                ABSTRACT

A method and apparatus are providing for converting energy into thrust, and directing the thrust to move an object. The apparatus includes a chamber having air disposed therein, a pulsed laser for converting an energy source into light pulses, and a lens for receiving the light pulses and directing the light pulses toward a focal point within the chamber. Each light pulse converges in a region which is proximate to the focal point and causes molecules within the air which are at the region to disassociate. Disassociation of the molecules generates pressure waves which provide thrust for powering the object to move.

7 Claims, 2 Drawing Sheets

APPARATUS POWERED USING LASER SUPPLIED ENERGY

BACKGROUND OF THE INVENTION

1. Cross Reference To Related Application

This application is being filed simultaneously with another application by the same inventor entitled AN ENGINE POWERED BY CYLINDER CONTAINED LASER EXPLOSION, having Attorney Docket No. 0408F-9406, Ser. No.08/265,383 filed on Jun. 24, 1994, which was subsequently abandoned and continued in continuation-in-part application Ser. No. 08/482,818, filed on Jun. 7, 1995.

2. Field of the Invention

This invention relates in general to devices for harnessing energy to perform work, and in particular to an apparatus powered using laser supplied energy for generating thrust to move an object.

3. Description of the Prior Art

Different devices have long been used for converting different forms of energy into mechanical forces for performing work. Examples of devices for converting different forms of energy into work include engines, such as electric motors, internal combustion engines, gas turbines and jet engines. These engines are often used to provide power for moving automobiles, trains, ocean going vessels and airplanes. Other examples of such devices include guns or artillery pieces for converting chemical energy into kinetic energy of projectiles Some engines under existing technology are powered utilizing fossil fuels. Fossil fuels are typically ignited using sparks or some form of heat, such as from electrical energy, to initiate combustion. These fossil fuels are typically burned in a combustion reaction of the type having a rate of reaction which would be considered deflagration, that is, slower than the speed of sound in the combustion materials, rather than at a denotation combustion rate, which is a rate of reaction which is greater than the speed of sound in the combustion materials.

A problem with prior art engines is that readily available energy sources utilizing rates of combustion which are classified as deflagration are limited in the amount of energy available for powering various objects, as compared to that which would be possible if engines were available which are powered by detonation pressure waves.

Prior art devices for converting chemical energy directly into work typically rely on containing a combustion reaction within a chamber. Gases released by combustion provide a volumetric expansion and increased pressures which provide thrust for propulsion of different objects. Often, this combustion reaction provides by-products which may not only harm the environment, but typically foul the device used to perform work. For example, in an internal combustion engine, combustion by-products will result in deposits which increase wear and reduce engine life.

Other prior art devices have converted energy into work by using intermediate forms of energy. An early example of this is the steam engine, in which a primary fuel is burned to provide heat for generating steam. The steam is then used to drive a piston, or turbine, which provides rotary motion for performing work. However, this type of device very often incorporates means by which energy is lost or wasted. The different processes of converting between various forms of energy each include inefficiencies by which energy is lost. Such as in the steam engine, energy is often lost as heat transferred from the hot steam, and also in inefficient combustion.

Another device for converting energy into work is the electric motor. However, electric motors also have problems with inefficiency due to electrical power transmission losses, as well as energy losses which result from converting from one form of power to electrical power. Further, electric motors emit very strong magnetic fields, which may not only result in large energy losses, but which are also currently undergoing increased scrutiny to determine the yet unknown environmental health hazards they pose. Additionally, the high voltages required for operating high power electric motors are also hazardous.

Further, some forms of energy are inherently dangerous. Just as fossil fuel energy sources pose problems of air pollution, nuclear energy poses problems of exposure to radiation. Current systems for harnessing nuclear energy utilize an intermediate means for transferring the energy, which is typically steam used to power turbines for generating electricity. However, as discussed above, converting between intermediate forms of energy results in many inefficiencies. Further, hazardous conditions still exist with primary fluid loops containing hazardous radioactive fluids, as well as electric motors emitting potentially dangerous electrical fields, as discussed above.

A simple means for transmitting forms of energy, and converting that energy into work is desired.

SUMMARY OF THE INVENTION

A method and apparatus are providing for converting energy into thrust, and directing the thrust to move an object. The apparatus includes a chamber having air disposed therein, a pulsed laser for converting an energy source into light pulses, and a lens for receiving the light pulses and directing the light pulses toward a focal point within the chamber. Each light pulse converges in a region which is proximate to the focal point and causes molecules within the air which are at the region to disassociate. Disassociation of the molecules generates pressure waves which provide thrust for powering the object to move.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
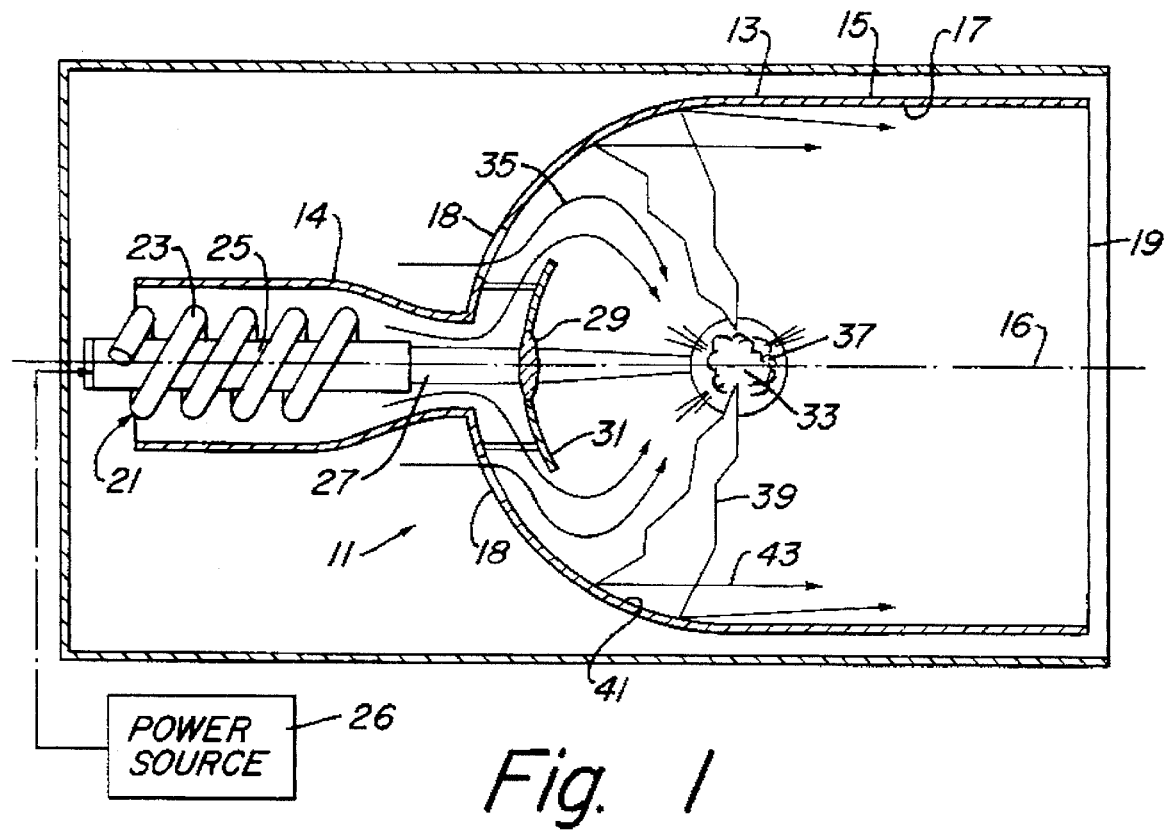
FIG. 1 is a sectional view schematically depicting a jet engine of the present invention.

FIG. 1 is a sectional view depicting jet engine 11 of the present invention. Jet engine 11 includes tubular housing 13 having forward section 14 and a rearward section 15 which are centered about central axis 16 of tubular housing 13.

Chamber 17 is defined within rearward section 15. Forward section 14 has a necked down portion which extends into rearward section 15 for passing air into chamber 17. Inlet ports 18 pass through the forward wall of section 15 for passing air into chamber 17. Exhaust port 19 provides an open end for chamber 17, opposite inlet ports 18.

Laser 21 is provided within forward section 14. Laser 21 includes flash lamp 23 and YAG laser rod 25, which are centered about central axis 16 of tubular housing 13. Power source 26 supplies energy to excite laser 21 to emit light pulses 27 into chamber 17, along central axis 16. In the preferred embodiment, power source 26 provides electrical power. However, in other embodiments of the present invention, other power sources may be used, such as combustion in combination with gas dynamic lasers.

Lens 29 is secured within housing 13 by lens support 31. Lens 29 is positioned near the forward wall of section 15, but spaced therefrom, along axis 16. Lens 29 is centered about axis 16 for directing light pulses 27 to converge in a region about focal point 33, which is located on axis 16 of housing 13.

Laser 21 is operated to emit light pulses in rapid succession for generating pressure waves. One such light pulse is depicted as pulse 27. The light pulses are focused to the region about focal point 33. Air flows through inlet port 18 and through forward section 14 to pass into chamber 17, as depicted by arrows 35. Convergence of light pulses 27 in the region about focal point 33, within air, causes bursts of pressure 37 to occur within chamber 17.

Bursts 37 create randomly directed pressure waves which are schematically depicted by lines 39. Such pressure waves may include detonation wave fronts, which travel faster than the speed of sound through the medium in which they are travelling. The forward end of internal surface 41 of chamber 17 has a curved shape for directing the randomly directed pressure waves, as depicted by lines 39, towards exhaust 19 and in the direction depicted by arrows 43. Pressure waves directed in the direction of the arrows 43 create thrust for urging chamber 17 and housing 13 to move in a direction opposite of arrows 43.

In the preferred embodiment, the forward end of interior surface 41 is spherically shaped for directing pressure waves towards exhaust 19. Other embodiments of the present invention may use other types of curved shapes, such as parabolic shapes. Further, the rearward end of interior surface has a cylindrical shape for focusing light emitted during bursts 37 back toward focal point 33.

In theory, the bursts of pressure 37 may be caused by disassociation of diatomic molecules into two separate atoms, such diatomic nitrogen molecules disassociating from $N_2$ into two separate atoms of nitrogen (N+N). According to the ideal gas law, pressure will increase when a single diatomic molecule of nitrogen ($N_2$) is disassociated into two separate atoms of nitrogen (N+N). The Ideal gas law is $PV=nRT$. In this particular equation, P equals the pressure within chamber 17, V equals the volume of chamber 17, T is the temperature of particles within chamber 17, R is a constant, and n represents the number of molecules within chamber 17. Nitrogen disassociates and goes from molecules of $N_2$ into two separate atoms of nitrogen (N+N) and n doubles, therefor the pressure (P) will double. Additionally, energy released from disassociation of nitrogen, and energy passed into chamber 17 from laser 27, may cause other physical phenomenon within chamber 17 to further provide pressure waves which provide thrust.

Figure 2:
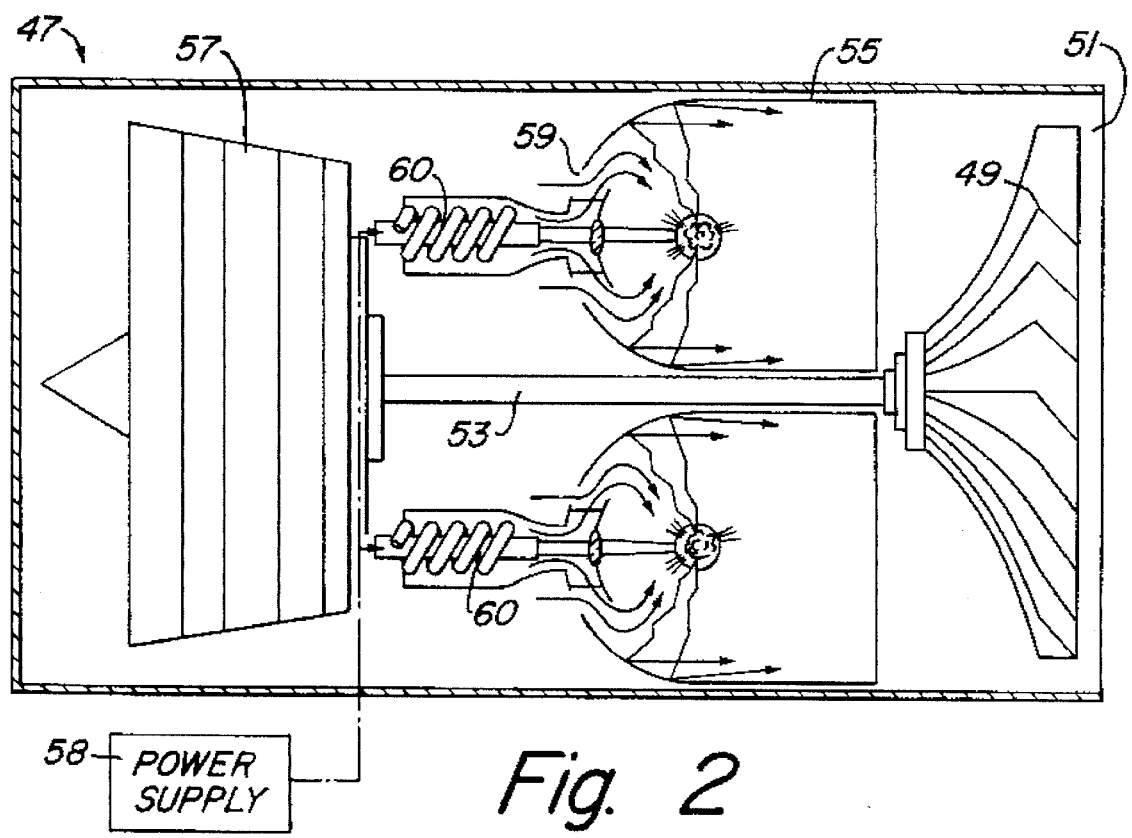
FIG. 2 is a sectional view schematically depicting a multiple engine configuration of a jet engine apparatus of the present invention.

FIG. 2 depicts a multiple jet engine configuration of another embodiment of the present invention, engine 47.

Engine 47 includes turbine 49 which is disposed within exhaust 51. Shaft 53 is connected to turbine 49 and rotatably secured within housing 55. Compressor 57 is secured to an end of shaft 53, which in the embodiment shown is opposite turbine 49. Compressor 57 compresses air passing to intake ports 59 in response to turbine 49 rotating within exhaust 51 as pressure waves pass through exhaust 51. It should be noted that other devices may be secured to shaft 53 for being powered by engine 47. Lasers 58 are not mounted on the axis of shaft 53, but otherwise are similar to laser 21 of FIG. 1. As discussed above for FIG. 1, power supply 60 powers lasers 58 to provide light pulses in rapid succession for generating pressure waves.

Figure 3:
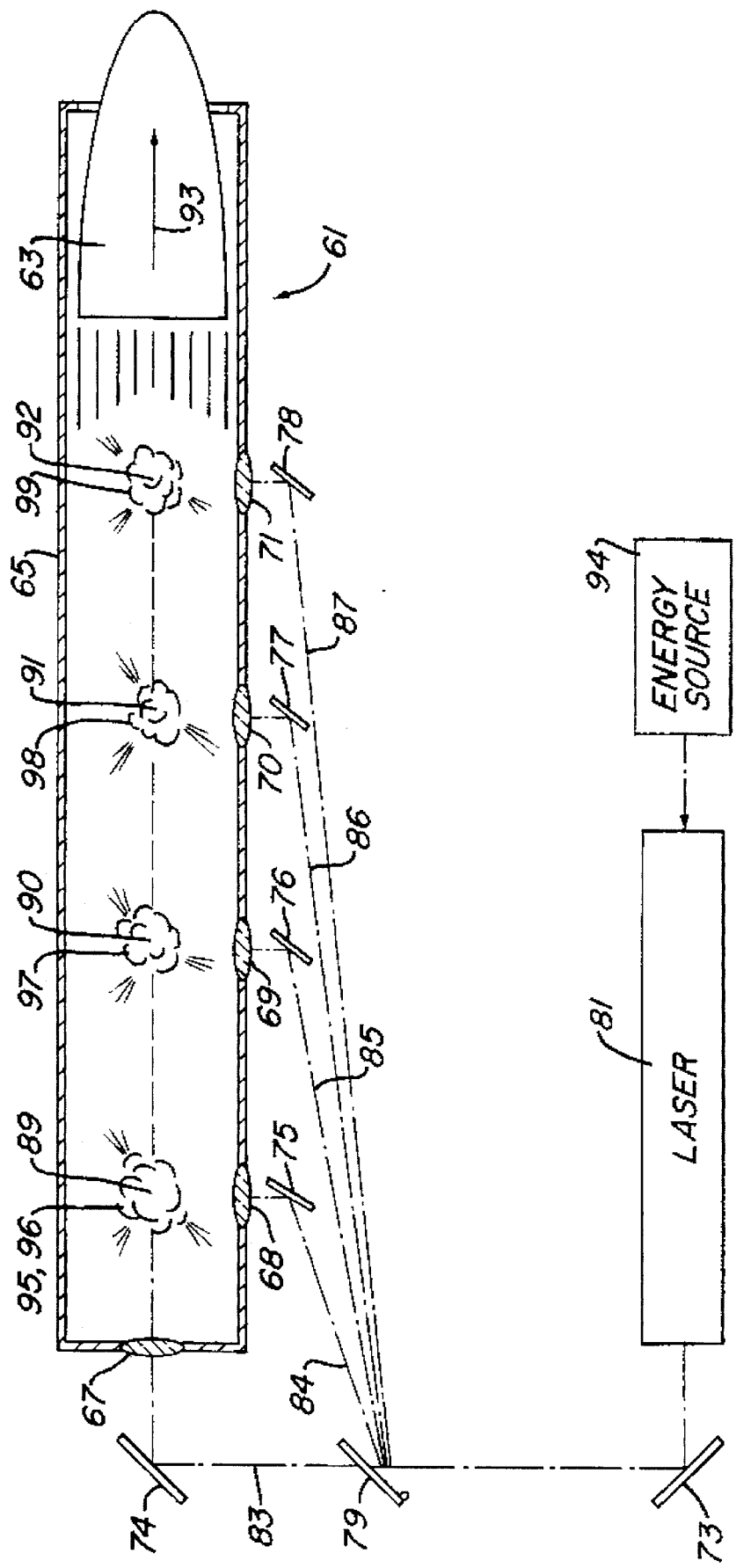
FIG. 3 is a sectional view schematically depicting an apparatus of the present invention for shooting a projectile from a barrel.

FIG. 3 is a sectional view schematically depicting yet another application of the present invention as embodied in apparatus 61. Apparatus 61 is for shooting projectile 63 therefrom. Apparatus 61 includes barrel 65, within which lenses 67 through 71 are disposed. Lens 67 is located within a closed end of barrel 65, and lenses 68 through 71 are located in sidewalls of barrel 65, spaced apart for focusing light pulses along a central axis of barrel 65.

Stationary reflectors 73 through 78 are secured to barrel 65. Further, pivoting reflector 79 is provided for directing the light pulses from laser 81 along various paths 83 through 87. One light pulse at a time is directed by pivoting reflector to a particular stationary reflector 73 through 78. Light pulses which pass along one of paths 83 through 87 converge at one of focal points 89 through 92, respectively, which are located along the central axis of barrel 65. Laser 81 is powered by power source 94.

Operation of apparatus 61 is now described. Initially, projectile 63 will be disposed adjacent to focal point 89. An initial light pulse passes from laser 81 and along path 83, by which the light pulse will pass from laser 81, to stationary reflector 73, to stationary reflector 74, through lens 67, which converges the light pulse to pass within a region which is proximate to focal point 89. Burst of detonation pressure 95 is created in response thereto. It should be noted that in passing along path 83, pivoting reflector 79 is moved out of the way so that it will not interfere with the light pulse passing along path 83.

Then, as projectile 93 is beginning to move, a second light pulse is passed from laser 81 along path 84, by which the light pulse passes to stationary reflector 73, pivoting reflector 79, which is moved into position for directing the light pulse from stationary reflector 73 toward stationary reflector 75. The light pulse then passes to stationary reflector 75, through lens 68, which converges the light pulse to a region about focal point 89, causing burst of detonation pressure 96. This further increases the pressure within barrel 65 as projectile 63 is moving therethrough.

Next, as projectile 63 passes beyond focal point 90, a light pulse is emitted from laser 81 to travel along path 85, along which the light pulse travels from laser 81 to stationary reflector 73, and to pivoting reflector 79, which is pivoted into position for directing the light pulse to travel to stationary reflector 76 and lens 69. The light passes to stationary reflector 76, which directs the light into lens 69, which converges the light to a region about focal point 90 to cause burst of detonation pressure 97 to be generated. This further increases the pressure within barrel 65.

This process is repeated as projectile 93 passes by focal point 91 to pass the light pulse along path 86 to the region about focal point 91 to generate burst 98. Also, burst 99 is generated by passing a light pulse along path 87 to the region about focal point 92, as discussed above for generating bursts 95 through 98. This increases the speed of projectile 93 to very high velocities. These light pulses are provided in rapid succession by laser 81.

Apparatus 61 of the present invention can be used for generating velocities of projectile 93 which are very high. For example, velocities as high as 8000 to 9000 feet per second may be possible with apparatus 61 of the present invention. Experimentation may also show that much higher velocities are possible. Apparatus 61 of the present invention may be used for a rifle, or an artillery piece.

In other embodiments, apparatus 61 could include multiple lasers for providing light pulses. Further, an electronic mirror array could be used wherein a series of mirrors change from transmissive to reflective for directing light to various focal ports, such as lenses 67 through 71.

It should be noted that in some embodiments of the present invention, including the above embodiments, the interior walls of a chamber within which the light is forced to generate the bursts can be reflective, or even partially reflective. This would reflect photons of light emissions back toward the focal points to increase the energy within the chamber, and thrust available to propel the object.

It should be noted that various power supplies and light emitting means combinations may be used in place of laser 21 in energy source 26, laser 58 and energy source 60, and laser 81 and energy source 94 shown above. For example, a gas dynamic laser could be utilized to burn a fossil fuel and generate laser light. Other embodiments may use a nuclear reaction for a power source to emit light to power the present invention. Thus, dangerous primary fluid loops containing radioactive fluids would not be required for transferring energy from within a nuclear reactor. Energy could be transported as light, rather than as heated radioactive primary and secondary fluids.

It should also be noted that materials other than air may be utilized for converging the light pulses therein to react to create the pressure waves for providing thrust. For example, nitrogen could be used by itself, rather being included within air. Further, other types of gases or materials may be used within which laser pulses may be focused to converge to a region about a focal point.

Laboratory tests were conducted which verified that the small power generated by a pulsed laser can be greatly magnified by focusing its energy through a lens and causing air molecules to disassociate and explode. When the laboratory tests were conducted with ambient lights turned off within the laboratory, laser induced blasts were repeated, with the explosions generating extremely bright light. One test was conducted utilizing a 0.04 joule yttrium-aluminum garnet (YAG) laser operating at 1.064 microns through a lens. The laser pulses were repeated in rapid succession and were 22 nanoseconds in duration, measured at the 50% power points. An object, having a mass of about 2 grams, was placed at the focal point of the laser. When the laser was actuated, the mass was propelled into the air with great force and velocity.

As discussed above, it is theorized that the disassociation of particles in the air, primarily molecules of nitrogen ($N_2$) caused the reaction observed in the laboratory tests. The molecules apparently moved rapidly and forcibly away from the focal point. The laser's energy alone was insufficient to cause the violent reaction observed which propelled the mass into the air with great force and velocity. Air molecules disassociating could have produced the additional energy. Further, additional photons may have added themselves to the laser energy and produced the increase energy levels observed. Some of the excess energy was released in the form of white-light emissions and air pressure waves.

The present invention is a pioneering invention initiating a new technology for receiving energy from an energy source and generating thrust for performing work. Potential applications include not only creating thrust for jet engines and to propel projectiles from gun and artillery barrels, but also for providing a new type of engine for converting an energy source into work. This new technology may provide potential solutions to problems of dangerous environmental hazards posed by use of fossil and nuclear fuels.

Although the invention has been described with reference to several specific embodiments, this description is not meant to be construed in a limiting sense. Various modifications of the disclosed embodiments as well as other alternative embodiments of the invention will become apparent to persons skilled in the art upon reference to the description of the invention. It is therefore contemplated that the appended claims will cover any such modifications or embodiments that fall within the true scope of the invention.

I claim:

1. An apparatus for converting energy into thrust, and directing the thrust to move an object, the apparatus comprising:

an energy source;

a laser for receiving energy from the energy source and emitting laser light in response thereto;

a chamber having air disposed therein;

a lens for receiving the laser light and directing the laser light toward a focal point within the chamber;

wherein directing the laser light toward the focal point within the chamber excites molecules of the air disposed within the chamber at the focal point to disassociate;

wherein disassociation of the molecules directly provides pressure waves which directly provide the thrust for powering the object to move;

a mounting bracket extending rearward at a forward end of the chamber, into the chamber; and wherein the lens is mounted to the mounting bracket, within the chamber, spaced apart from the forward end.

2. An apparatus for converting energy into thrust, and directing the thrust to move an object, the apparatus comprising:

an energy source;

a laser for receiving energy from the energy source and emitting laser light in response thereto;

a chamber having air disposed therein;

a lens for receiving the laser light and directing the laser light toward a focal point within the chamber;

wherein directing the laser light toward the focal point within the chamber excites molecules of the air disposed within the chamber at the focal point to disassociate;

wherein disassociation of the molecules directly provides pressure waves which directly provide the thrust for powering the object to move;

wherein the chamber is coaxially disposed about a central axis extending through forward and rearward ends of the chamber;

at least one air intake port disposed proximate to the forward end of the chamber;

an exhaust port disposed at the rearward end of the chamber, concentric with the central axis;

wherein the focal point is disposed on the central axis;

wherein the lens is disposed on the central axis;

the laser being coaxially disposed with the central axis, forward of the chamber, for emitting the light pulses along the central axis, through the lens and to the focal point;

a mounting bracket extending rearward at a forward end of the chamber, into the chamber; and wherein the lens is mounted to the mounting bracket, within the chamber, spaced apart from the forward end and disposed on the central axis.

3. An apparatus for converting energy into thrust, and directing the thrust to move an object, the apparatus comprising:

an energy source;

a laser for receiving energy from the energy source and emitting laser light in response thereto;

a chamber having air disposed therein;

a lens for receiving the laser light and directing the laser light toward a focal point within the chamber;

wherein directing the laser light toward the focal point within the chamber excites molecules of the air disposed within the chamber at the focal point to disassociate;

wherein disassociation of the molecules directly provides pressure waves which directly provide the thrust for powering the object to move;

a mounting bracket extending rearward at a forward end of the chamber, into the chamber;

wherein the lens is mounted to the mounting bracket, within the chamber, spaced apart from the forward end; and an air inlet extending around the laser and into the forward end of the chamber for passing intake air around the laser and into the chamber, around the mounting bracket.

4. An apparatus for converting energy into thrust, and directing the thrust to move an object, the apparatus comprising:

an energy source;

a laser for receiving energy from the energy source and emitting laser light in response thereto;

a chamber having air disposed therein;

a lens for receiving the laser light and directing the laser light toward a focal point within the chamber;

wherein directing the laser light toward the focal point within the chamber excites molecules of the air disposed within the chamber at the focal point to disassociate;

wherein disassociation of the molecules directly provides pressure waves which directly provide the thrust for powering the object to move;

wherein the chamber is concentrically disposed about a central axis extending through forward and rearward ends of the chamber;

at least one air intake port disposed proximate to the forward end of the chamber, extending around the laser and into the forward end of the chamber for passing intake air around the laser;

an exhaust port disposed at the rearward end of the chamber, concentric with the central axis;

wherein the focal point is disposed on the central axis;

wherein the lens is disposed on the central axis;

the laser being coaxially disposed with the central axis, forward of the chamber, for emitting the light pulses along the central axis, through the lens and to the focal point;

a mounting bracket extending rearward at a forward end of the chamber, into the chamber; and wherein the lens is mounted to the mounting bracket, within the chamber, rearward of the at least one intake port.

5. In an engine for generating thrust and directing the thrust to move an object, the engine having a chamber with air disposed therein, an intake port for passing air into the chamber, and an exhaust port for exhausting the air from the chamber, the improvement comprising:

an energy source;

a pulsed laser for emitting light pulses in response to energy provided by the energy source;

a lens for receiving the light pulses and directing the light pulses toward a focal point within the chamber;

wherein directing the light pulses toward the focal point within the chamber excites molecules within the air to disassociate;

wherein disassociation of the molecules within the chamber directly provides pressure waves which provide thrust;

a mounting bracket extending rearward at a forward end of the chamber, into the chamber; and wherein the lens is mounted to the mounting bracket, within the chamber, spaced apart from the forward end.

6. In an engine for generating thrust and directing the thrust to move an object, the engine having a chamber with air disposed therein, an intake port for passing air into the chamber, and an exhaust port for exhausting the air from the chamber, the improvement comprising:

an energy source;

a pulsed laser for emitting light pulses in response to energy provided by the energy source;

a lens for receiving the light pulses and directing the light pulses toward a focal point within the chamber;

wherein directing the light pulses toward the focal point within the chamber excites molecules within the air to disassociate;

wherein disassociation of the molecules within the chamber directly provides pressure waves which provide thrust;

a mounting bracket extending rearward at a forward end of the chamber, into the chamber;

wherein the lens is mounted to the mounting bracket, within the chamber, spaced apart from the forward end; and at least one air inlet extending around the laser and into the forward end of the chamber for passing intake air around the laser and into the chamber, around the mounting bracket.

7. A jet engine for generating thrust which is directed to move an object, the jet engine comprising:

a tubular housing having a central axis, a forward section and a rearward section, wherein the forward and the rearward sections are centered about the central axis;

a necked down portion defined by the forward section and extending rearward into the rearward section for passing air therethrough and into the rearward section;

a chamber defined by the rearward section, the chamber having inlet ports disposed in a forward wall of the chamber and an open end which defines an exhaust port with the exhaust port disposed across the chamber, opposite of the inlet ports;

a laser disposed within the forward section for emitting light pulses along the central axis;

a lens secured within the tubular housing along the central axis for receiving the light pulses from the laser, and directing to light pulses to converge at a focal point disposed on the central axis;

wherein focusing the light pulses to a focal point causes molecules of air disposed at the focal point to disassociate, which directly causes pressure waves which expel the air through to exhaust port and from the chamber to directly provide the thrust which moves the object in a forward direction;

a lens mounting bracket extending rearward within the chamber from the forward end of the chamber, spaced apart from the forward end; and the lens being mounted to the lens mounting bracket, along the central axis of the tubular housing.

* * * * *